United States Patent
Rostaing et al.

(10) Patent No.: US 7,214,944 B2
(45) Date of Patent: May 8, 2007

(54) RADIATION DETECTION SYSTEM ALLOWING IMPROVED COUNTING OF EVENTS

(75) Inventors: Jean-Pierre Rostaing, La Cote Saint Andre (FR); Edith Beigne, Meaudre (FR)

(73) Assignee: Commissariat a l'Energie Atomique, Paris (FR)

( * ) Notice: Subject to any disclaimer, the term of this patent is extended or adjusted under 35 U.S.C. 154(b) by 211 days.

(21) Appl. No.: 11/014,868

(22) Filed: Dec. 20, 2004

(65) Prior Publication Data

US 2005/0139777 A1 Jun. 30, 2005

(30) Foreign Application Priority Data

Dec. 30, 2003 (FR) .................................. 03 51233

(51) Int. Cl.
*G01T 1/24* (2006.01)
*G01J 1/42* (2006.01)
*G01T 1/20* (2006.01)
*G01T 1/164* (2006.01)

(52) U.S. Cl. ............................ 250/370.06; 250/363.03; 250/366; 250/394

(58) Field of Classification Search ............ 250/370.06; 327/22, 23, 24; 377/28
See application file for complete search history.

(56) References Cited

U.S. PATENT DOCUMENTS

| | | | |
|---|---|---|---|
| 4,658,216 A | | 4/1987 | Goulding et al. |
| 5,574,758 A | * | 11/1996 | Murakami et al. .......... 376/245 |
| 5,880,469 A | * | 3/1999 | Miller ........................ 250/367 |
| 7,045,802 B2 | * | 5/2006 | Vernon ...................... 250/526 |
| 7,057,179 B2 | * | 6/2006 | Arques et al. .......... 250/370.01 |
| 2004/0141587 A1 | * | 7/2004 | Arques et al. ............. 378/98.8 |

FOREIGN PATENT DOCUMENTS

| | | |
|---|---|---|
| FR | 2 847 678 | 5/2004 |
| GB | 1 406 685 | 9/1975 |
| SU | 409164 | 6/1974 |

OTHER PUBLICATIONS

Furber, S.B., "The Return of Asynchronous Logic", Proceedings of the International Test Conference, Oct. 1996, pp. 938.*

* cited by examiner

*Primary Examiner*—David Porta
*Assistant Examiner*—Frederick F. Rosenberger
(74) *Attorney, Agent, or Firm*—Oblon, Spivak, McClelland, Maier & Neustadt, P.C.

(57) ABSTRACT

The invention concerns a radiation detection device comprising a plurality of detector elements (DET1, DET2), each detector element (DET1) being associated with a circuit (AMP1-CMP1) for acquiring pulse signals (H1) and for counting (CNT1) detection events.

The invention provides for means (COR) of correlating detection events corresponding to at least two detector elements (DET1/DET2).

12 Claims, 6 Drawing Sheets

RADIATION DETECTION SYSTEM ALLOWING IMPROVED COUNTING OF EVENTS

FIELD AND STATE OF THE PRIOR ART

The present invention is connected to a radiation detection device and concerns, in a general manner, the field of the detection and the measurement of exposure to any type of radiation of a corpuscular or wave nature, such as particles and photons, particularly radiations of protons, neutrons, electrons, positrons, $\alpha,\beta,\gamma$ radiation, X-ray photons, visible light photons and photons outside the visible spectrum.

The invention applies, among other things, to matrix architecture detection devices used in imaging, particularly in the field of radiology, where X-ray matrix imagers are used, commonly known as "sensors".

Radiation detection devices of the prior art are known in which the structure is formed of one or several detector elements combined with an electronic device for processing and counting pulses generated by the detector element during a capture event of a photon or a particle.

In particular, radiation detection devices arranged in a matrix architecture that comprise a detection entity combined with a processing/acquisition entity are known.

The matrix assembly formed by the detection entity (commonly known as "detection circuit") combined with the electronic acquisition and counting entity (commonly known as "reading circuit") constitutes a "sensor".

The detection entity may be formed by a gas, a scintillator associated with a semi-conductor, or by layers of detector material, which absorb the photons or the particles and finally transform them into electric pulses (electronic charge packets).

The expression "charge packet" herein designates, in a general manner, positive or negative charge packets, particularly holes or electrons or positron-electron pairs.

The electronic entity is formed of a matrix arrangement of electronic processing and acquisition circuits, the function of which is to carry out a counting of detection events of photons or particles.

Matrix electronic circuits may be made using silicon technology, for example using Bipolar, CMOS or BICMOS technology.

Figure 1A:
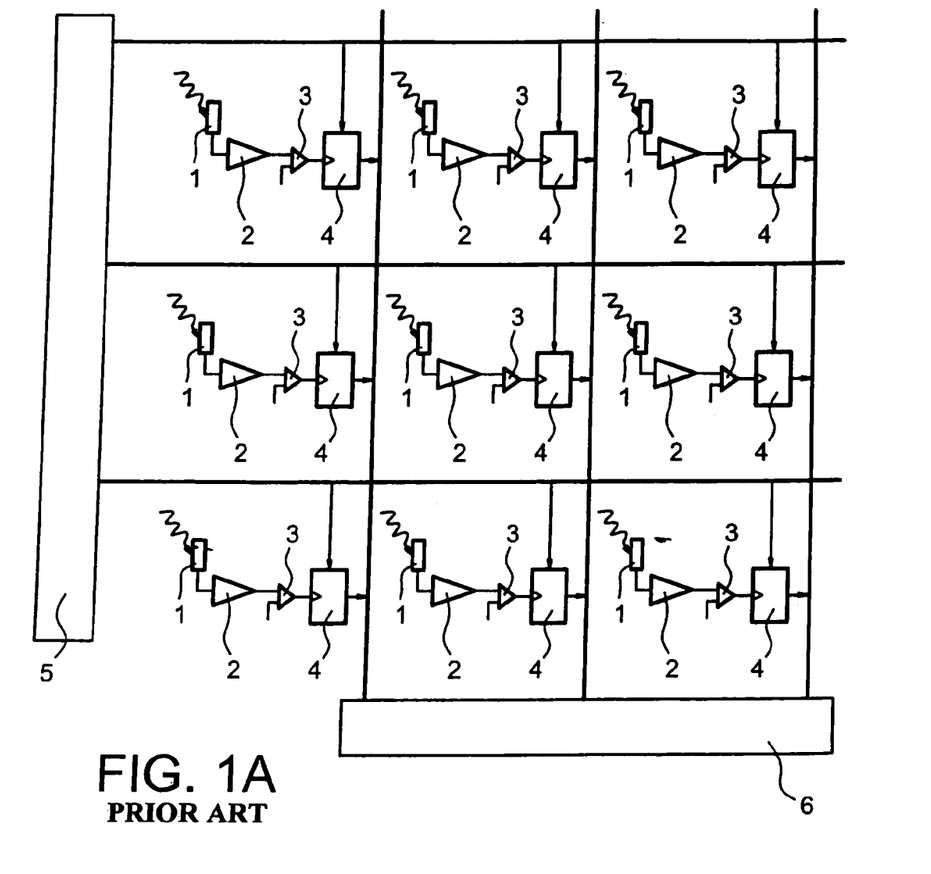
FIG. 1A represents a schematic diagram of a matrix architecture detector formed of a network of pixels, according to the prior art.

FIG. 1A shows the matrix structure of an imager of the prior art.

The imager comprises a plurality of detector elements 1 that may consist of discrete elements such as gas scintillator tubes or a continuum of elementary detectors formed in one or several layers of detection layers, for example a semi-conductor.

Each detector element 1 is combined with an acquisition and counting chain 1,2,3,4, the function of which is to process the electric pulses coming from the detector and to count the detection events normally corresponding to the capture of a photon or a particle.

Figure 1B:
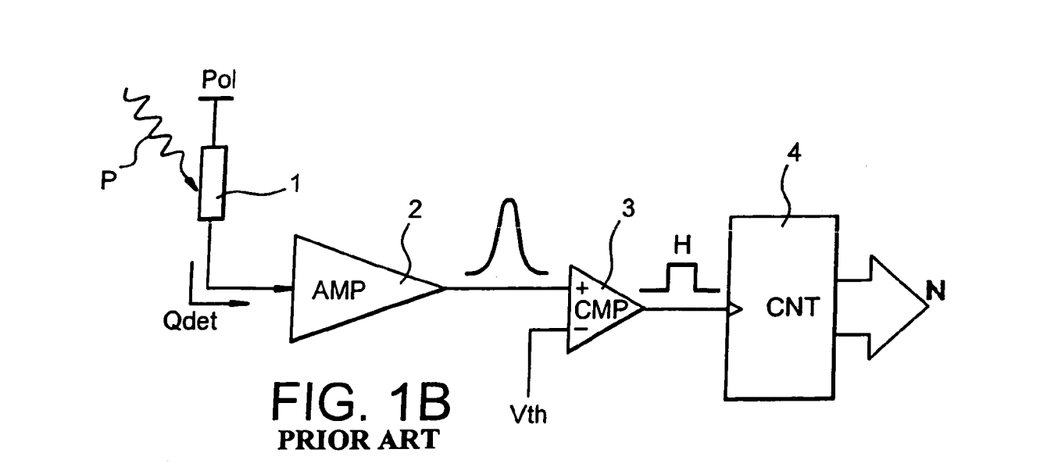
FIG. 1B represents a schematic diagram of a chain for acquiring and counting pulses coming from a detector element corresponding to a pixel, according to the prior art.

FIG. 1B shows a schematic diagram of a known type of acquisition circuit. The detector element 1, subjected to a polarization voltage Pol, is connected to an amplifier circuit 2, the function of which is to convert each charge packet Qdet generated by the detector into a voltage signal. The voltage signal pulses are applied to the input + of a comparator CMP in such a way as to detect the signal pulses that have sufficient amplitude to overcome a voltage threshold level Vth and to deliver calibrated pulses H, which are applied to the input of a logic circuit 4 consisting of a binary counter CNT. The CNT counter counts each pulse H coming from the acquisition chain of the detector 1 and stores in the memory the total number N of pulses detected, which normally corresponds to the number of capture events of a photon or a particle P by the detector 1. The assembly formed from the combination of a detector element with an acquisition and event counting circuit forms what is called a pixel in an imager.

For each particle detected in the semi-conductor element 1, the counter 4 of the particles detector must be incremented by one unit. Not incrementing the counter amounts to not using the detected particle and, consequently, degrading the statistic and the quality of the image formed.

Figure 2:
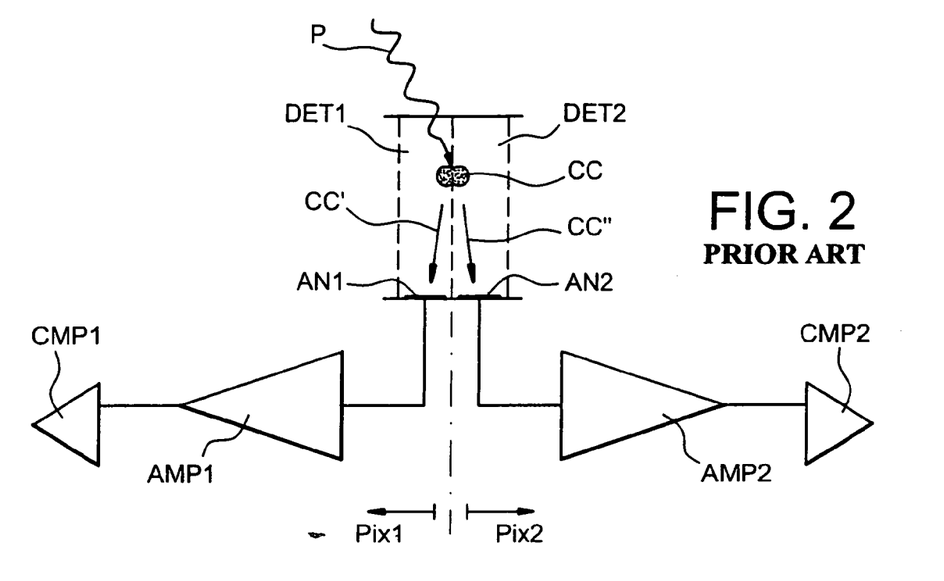
FIG. 2 schematizes the detection of an interaction at the boundary between two neighboring detectors that generates a problem of counting of two events, according to the prior art.

FIG. 2 schematizes the phenomena that occur during the interaction of a photon or a particle P at the boundary between two detector elements DET1 and DET2 corresponding to two adjoining pixels PIX1 and PIX2.

When the particle or the photon P creates charges in the same place of the detection layer in the median zone separating two detector elements DET1/DET2, in other words the normal zone at the boundary between two adjoining pixels, the "cloud" of charges CC risks being divided into two charge packets CC' and CC" on approaching the anodes AN1/AN2 of the two detectors. Consequently, the charge packets CC' and CC", which do not necessarily have equal charges, reach at the same instant the two anodes AN1 and AN2, which are connected to two acquisition chains AMP1-CMP1 and AMP2-CMP2. There is then triggering of two comparators CPM1 and CMP2 in the two pixels PIX1 and PIX2, which leads to a double counting, even though there has only been a single interaction: there is then a generation of a false event, which is at least as serious as not counting a real event.

Thus, when a particle is absorbed in a place close to the boundary between two neighboring detector elements, the delivered charges may be spread out in the absorption layers of the two adjoining pixels, principally due to diffusion phenomena. Two particles are counted whereas only one should actually be counted. This problem becomes even more acute the smaller the dimensions of the elementary detectors, which is the case, for example, in mammography. Since the evolution of technologies is leading to a miniaturization of circuits, this problem is likely to be encountered with increasing frequency in other applications.

One known solution, which works well with synchrotron radiation sources and with detection layers in silicon or in gallium arsenide, consists in adjusting the threshold of the comparators CMP1 and CMP2 as near as possible to an amplitude equal to half of the amplitude of the electric pulse that the detected particle generates. In this case, only the pixel detector that has collected more than half of the charges counts the particle. This solution resolves numerous cases. However, there remains the problem of particles detected very close to the boundary between two adjoining pixels and the problem of adjustment dispersions.

A further disadvantage of this solution consists in that it does not apply to the field of conventional radiology, for two reasons. Firstly, X-ray generator tubes emit a continuous spectrum of energy. The ratio between the maximum energy emitted and the minimum energy emitted is typically from 2 to 3. Consequently, there is no sense in defining a half amplitude of a "standard" photon. Secondly, the detector materials may be semi-conductors of lower quality than silicon or gallium arsenide, such as, for example, selenium (Se), cadmium telluride (CdTe), lead oxide (PbO), lead iodide (PbI2), mercury iodide (HgI2), thallium bromide (TlBr). In these materials, the electronic charge transport properties are mediocre and the charge finally read depends on the depth of absorption of the photon X into the layer. Said depth can vary in an important and random manner from one photon absorbed to another. Again, in this case, there is no sense in defining an amplitude half of the amplitude of a detected photon.

Another possible retort to double counting is to ensure that the first pulse CC' that appears in time is counted and that the second pulse CC' which then appears is not taken into account.

A single pulse is counted, which conforms to the "one single event" hypothesis.

However, this solution excludes, by principle, any event in the adjoining pixel PIX2 after the detection of the first pulse CC' in the pixel PIX1, which therefore dismisses the interactions due to other photons, which are real events.

The higher the radiation flux, the higher this problem of loss of information.

The aim of the invention is to provide a radiation detection device that does not have these disadvantages.

One aim of the invention is to provide a detection system that makes it possible to identify real events compared to false events.

The aim of the invention is to obtain a system that makes possible the counting of two real events caused by two interactions while avoiding the superfluous counting of a false event during a single interaction.

A further objective of the invention is to provide a detection system that makes it possible to distinguish real events from false events, at a high working frequency (thus under a high flux of particles or photons) however brief the time interval separating two pulses.

The final aim of the invention is to differentiate the case where a single photon or a unique particle arrives on two adjoining pixels, and the case where two photons or two particles arrive on two adjoining pixels.

BRIEF DESCRIPTION OF THE INVENTION

In a surprising manner, the invention provides for differentiating the nature of events by analyzing the chronological correlation of the electric signal pulses corresponding to these events, said analysis making it possible to distinguish the following cases:

case of correlation of two pulses or chronological coincidence of two pulses, in which the time base of a pulse from one detector substantially coincides with the time base of another pulse from an adjoining detector. This case corresponds to a single interaction, thus a single event correlated with a false event. More precisely, one of the two pulses generated has a wider time base than the other pulse, the time base of the first pulse overlapping the smaller time base of the second pulse. The two pulses coming from a single interaction have transition fronts according to the following sequence:
initial front of the first signal,
initial front of the second signal,
final front of the second signal and,
final front of the first signal.

case of decorrelation of two pulses or absence of chronological coincidence of two pulses, in which the time base of a pulse from one detector does not coincide with the time base of another pulse from an adjoining detector. This case corresponds to two real decorrelated events. The two pulses generated have time bases of the same order of magnitude. They may partially overlap but they then have a time shift. More precisely, the two pulses from two interactions provide transition fronts according to the following sequence:
initial front of the first signal,
initial front of the second signal,
final front of the first signal and,
final front of the second signal.

The invention is realized with a radiation detection device comprising a plurality of detector elements, each detector element being associated with a circuit for acquiring pulse signals and counting detection events, the device comprising at least one correlator, or means of correlation, of detection events corresponding to at least two detector elements.

Advantageously, said at least one correlator receives at least two pulse signals coming from respective detector elements and controls the counters or means of counting corresponding respectively to each detector element, in such a way as to count a single detection event when two pulse signals are correlated, in other words concord, converge or coincide.

According to the invention, the events correlator is capable of comparing the temporal overlap of a pulse signal from one detector element compared to another pulse signal from another detector element.

Advantageously, the correlator makes it possible to distinguish:

cases of correlation (or cases of coincidence) in the case of temporal overlap of a pulse signal by another pulse signal, particularly when the time base of a pulse completely overlaps the time base of another pulse, compared to:

cases of non-correlation (or anti-coincidence) in the case of simple temporal shift of a pulse signal compared to another pulse signal, particularly when the time base of a pulse partially overlaps or does not overlap the time base of another pulse.

It is provided, according to the invention, that the correlator is capable of:

incrementing a counter corresponding to each pulse signal coming from a respective detector element, so long as a pulse signal is produced in isolation, incrementing only one of the corresponding counters when two pulse signals are correlated, the duration of the first pulse overlapping in time the duration of the second pulse; and/or, incrementing the two corresponding counters when two pulse signals are decorrelated, the duration of the first pulse not overlapping in time or partially overlapping the duration of the second pulse.

According to an embodiment of the invention, the correlator has an asynchronous logic capable of comparing the occurrence chronologies of transition fronts of at least two pulse signals coming from respective detector elements.

It is provided that the correlator detects:
a case of correlation/coincidence, when an initial front of a first pulse signal is followed by an initial front of a second pulse signal, which is itself followed by a final front of the second pulse signal, or instead,
a case of non-correlation (anti-coincidence), when an initial front of a first pulse signal is followed by an initial front of a second pulse signal which is itself -followed by a final front of the first pulse signal.

BRIEF DESCRIPTION OF DRAWINGS

Other aims, characteristics and advantages of the invention will become clear on reading the following description of embodiments, given uniquely by way of example and in nowise limitative, and by referring to the appended drawings, in which:

FIGS. 4A–5C represent chronograms of pulse signals during two interactions close in time in two pixels;

DETAILED DESCRIPTION OF SPECIFIC EMBODIMENTS

The principle of the invention is based on the distinction of real events, in other words electrical signals created by different interactions, compared to false events, in other words electrical signals coming from a single and same interaction.

Figure 4A:
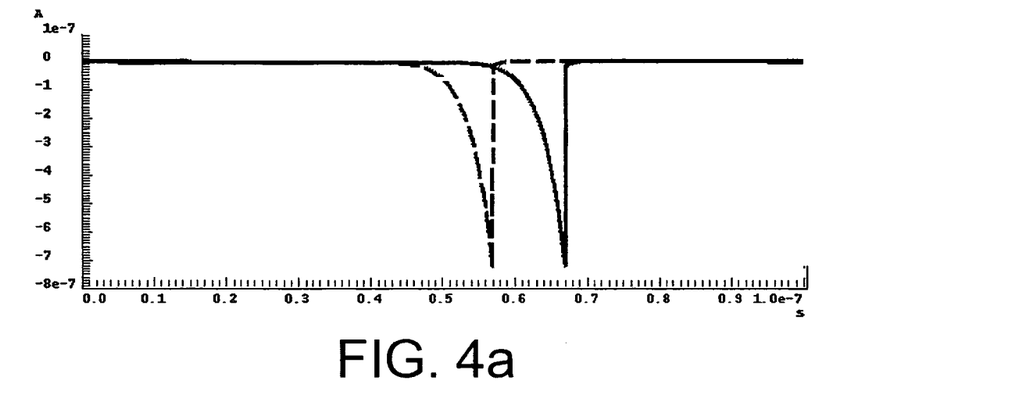
Figure 4B:
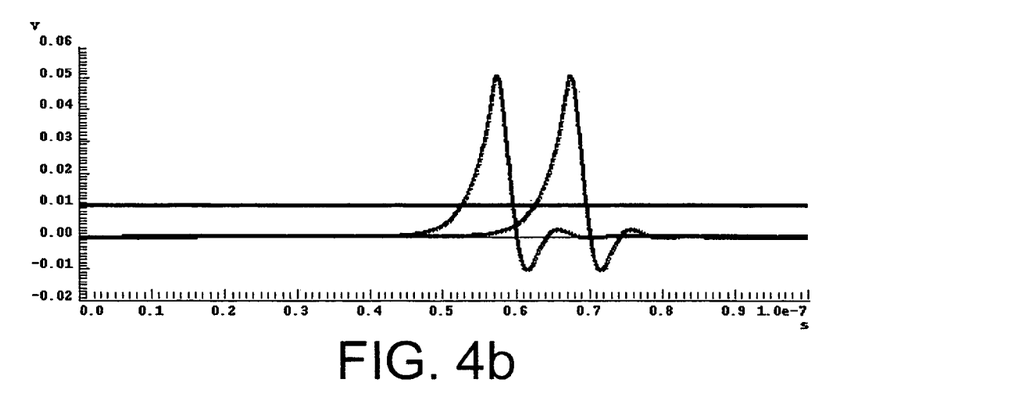
Figure 4C:
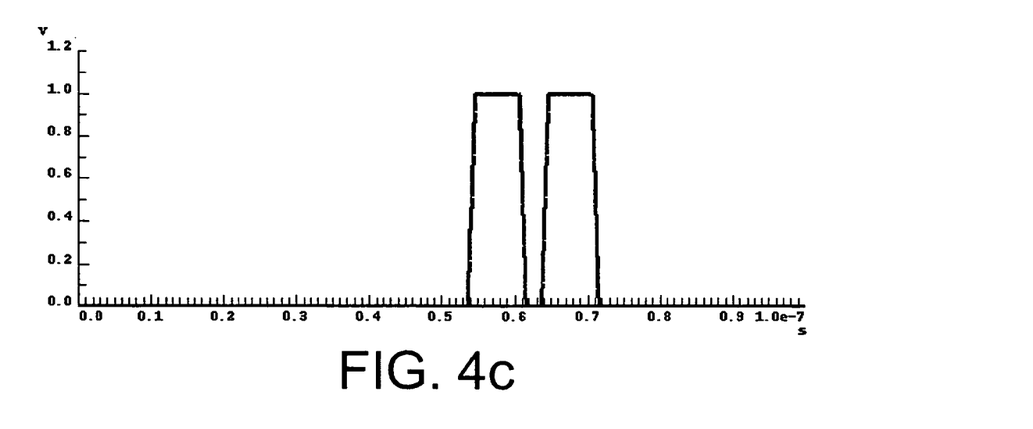

FIGS. 4A–6C show the results obtained with two adjoining identical pixels each having detectors and electronic acquisition circuits and identical counting subjected to different stimuli, depending on the following situations:

$1^{st}$ situation (FIGS. 4A–4C: two distinct particles or photons P' and P''' of any energy separated in time, interact in each of the pixels PIX 1 and PIX2. In this first case, the signals from the comparators have a time gap and do not overlap. Each pulse is isolated. In this simple case, each event is taken into account and does not require any particular provision.

Figure 5A:
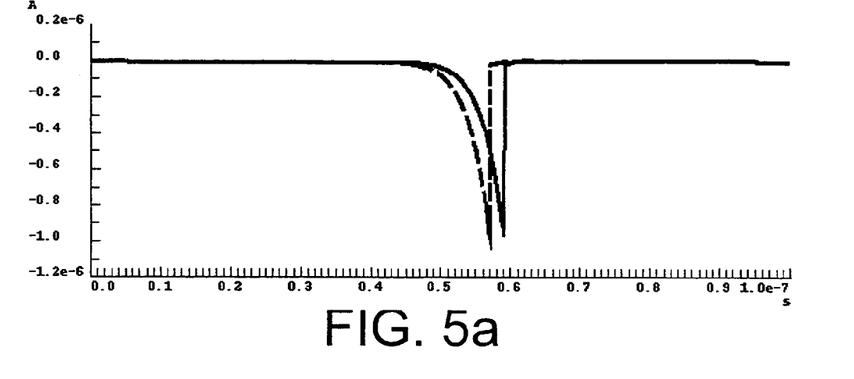
Figure 5B:
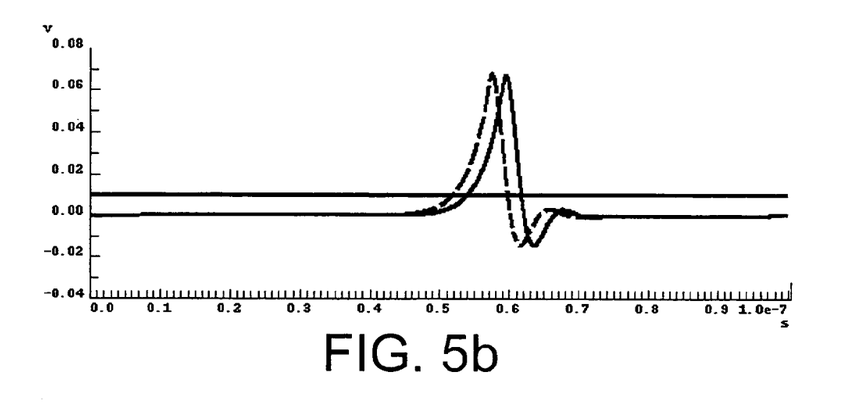
Figure 5C:
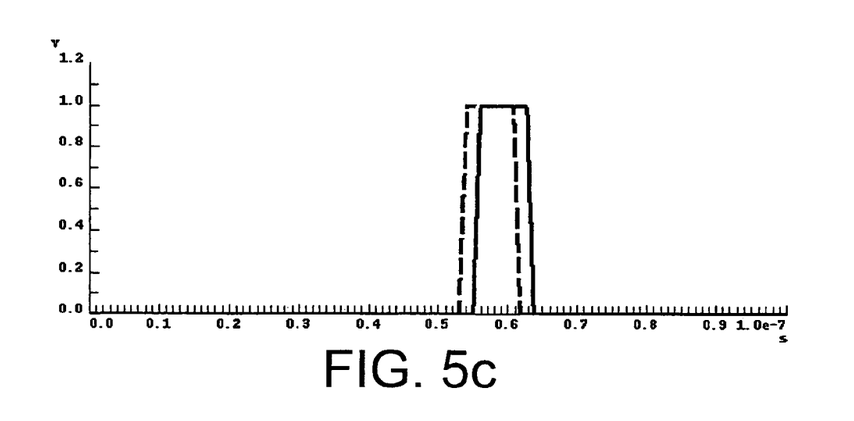

$2^{nd}$ situation (FIGS. 5A–5C: two photons of any energy, close in time, interact in each of the pixels: the two pulses overlap but are shifted by translation in time. There is a partial overlap of one pulse by the other pulse, the two pulses having durations of the same order of magnitude.

Figure 6A:
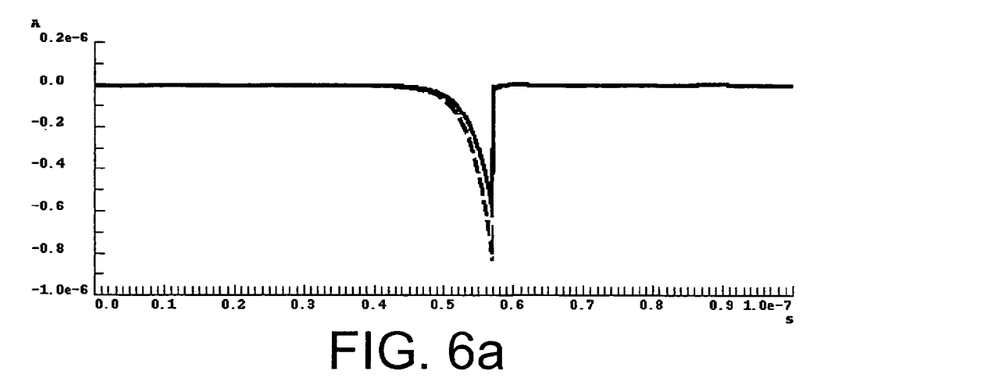
FIGS. 6A–6C represent chronograms of pulse signals during an interaction at the boundary between two pixels.
Figure 6B:
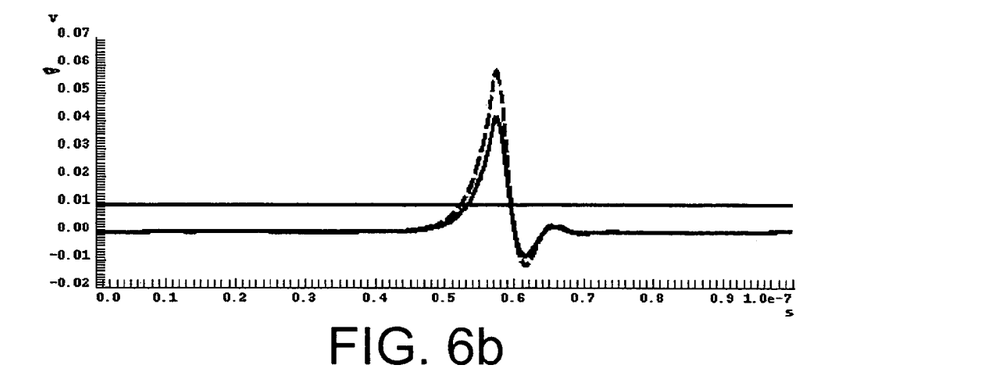
Figure 6C:
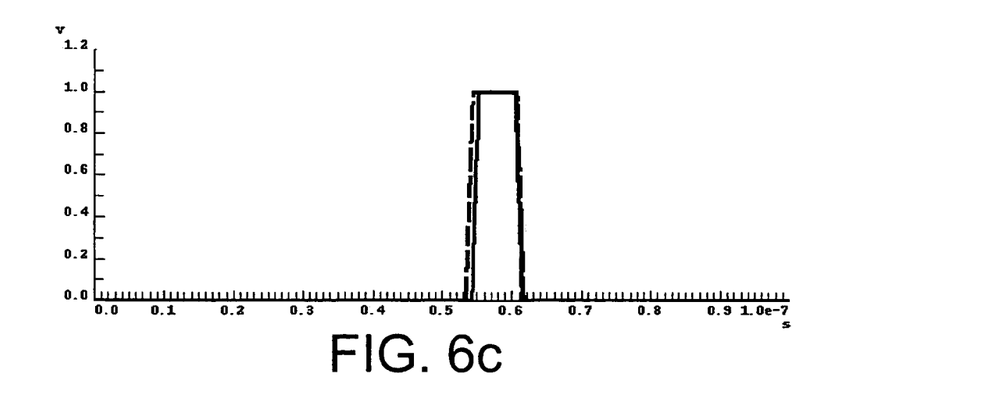

$3^{rd}$ situation (FIGS. 6A–6C: a photon or a particle P of any energy generates charges that are divided into two packets CC' and CC''. One observes that one pulse is larger than the other, so that the two comparators CMP1 and CMP2 do not commutate simultaneously. The pulse signals from the comparators overlap.

Thus, in a surprising manner according to the invention, one observes that one can identify the nature of events by their correlation:

Two real events are 'decorrelated'; they can overlap chronologically, by translation in time. According to the invention, one discovers a sequence of transition fronts of pulse signals that take the following order:

initial front of the first signal, followed by,
initial front of the second signal, followed by,
final front of the first signal, finally followed by,
final front of the second signal.

Two false events are correlated; the largest pulse signal has a larger time base that overlaps the reduced time base of the smallest pulse signal. According to the invention, one discovers another sequence of transition fronts of pulses in the following order:

initial front of the first signal, followed by,
initial front of the second signal, followed by,
final front of the second signal, finally followed by,
final front of the first signal.

The terminology used in the present document uses several terms to differentiate these very distinct situations:

$1^{st}$ situation: two events that are not linked in any way are produced in isolation in a manner sufficiently far apart in time so that the signals do not show any overlap. There is no correlation.

On the other hand, when two pulses are produced in a concomitant manner in close time intervals, one of the pulses overlapping at least partially the other pulse, one distinguishes, according to the invention, two other situation(s):

$2^{nd}$ situation: two independent events are at the origin of two non-correlated pulses. One then observes a chronological shift by translation in time of the pulse signals. According to the invention, one observes in this situation that there is a partial but not total overlap of one of the pulses by the other pulse. In this case, we have divergent pulses.

$3^{rd}$ situation: in this case, we have two pulses linked to a single event. The two pulses are correlated and one may vary as a function of the other. According to the invention, one observes in this third situation that there is a concordance in time, nearly a synchronism or a coincidence of the two pulses, and more precisely that the two pulses overlap, totally covering each other, one of the pulses having a wide time base that covers the reduced time base of the other, smaller pulse. Here, we speak of concordant or convergent pulses, in other words pulses that totally intersect, even if there is not an exact simultaneity of the two low to high transitions and the two high to low transitions of the two pulses.

In order to distinguish real events from false events, the invention provides for associating the electronic acquisition circuits of at least two pixels through the intermediary of an events correlation system that makes it possible to compare the pulse signals from different detector elements corresponding to said pixels.

Figure 3:
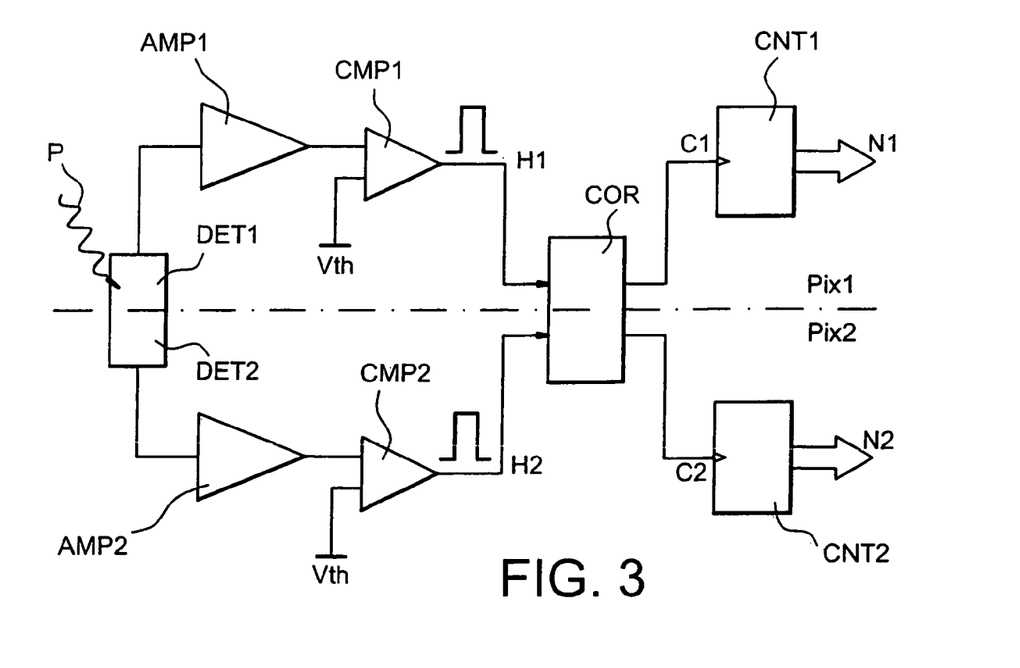
FIG. 3 represents a schematic diagram of a correlation system between two pixels, comprising two chains for acquiring and counting pulses coming from two adjoining detectors, according to the invention.

FIG. 3 shows the schematic diagram of a correlation system or of a correlator according to the invention in which the correlator is linked in such a way as to make a junction between two acquisition chains-corresponding to a first and a second pixel PIX1 and PIX2. These means of correlation are inserted and/or linked in an alternate manner between, firstly, the output line H1 of the first acquisition chain AMP1, CMP1 coming from a first detector element DET1 and the input C1 of the first counting circuit CNT1 of the first pixel PIX1, and secondly, between the output line H2 of the second acquisition chain AMP2, CMP2 coming from the second detector element DET2, and the input C2 of the second counting circuit CNT2 of the second pixel PIX2.

Thus, the correlation system COR is arranged to receive a first pulse signal from a first detector DET1 and a second signal from a second detector DET2, in such a way as to be able to compare their respective chronologies and in such a way as to deliver, in a coordinated manner, a first increment signal C1 intended for the first counter CNT1 and a second increment signal C2 intended for the second counter CNT2.

Figure 7:
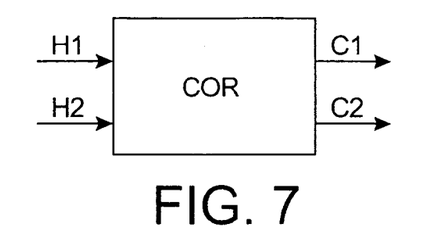
FIG. 7 is a bloc diagram of a correlator used in a radiation detection device according to the invention.

Thus, as represented in FIG. 7, the correlator receives at least two pulse detection signals H1 and H2 coming from respective detector elements, and delivers at least two counting pulse signals C1 and C2 intended to increment the counters corresponding to each detector element, in such a way as to count a single detection event when two pulse signals concord or converge.

According to the invention, the events correlator is capable of comparing the temporal overlap of a pulse signal from one detector element compared to another pulse signal from another detector element.

The invention is realized with a logic system that determines the nature of the event—real or false—by analyzing the incident sequence of pulse signals, and provides at the output one or several count signals adapted to each of the pixels in order to count the real events and not to count false events.

The anti-coincidence logic system that supplies, to the pixel, an appropriate signal that makes it possible to count the real events and not to count the false events is advantageously realized in asynchronous logic.

Asynchronous systems function with the single knowledge of the occurrence of events: in other words that each transition on an input or output contains an information, independently of the temporal variations between these transitions. The asynchronous systems may evolve in a locally synchronized manner, and the triggering of actions uniquely depends on the presence of an event to be processed.

This type of circuit is suited to the realization of a correlator according to the invention, which makes it possible to distinguish sequences of transition fronts of pulses and to trigger the above mentioned counting of events.

In an advantageous manner, the asynchronous circuit is tuned to signals transmitted in input (events).

Advantageously, the asynchronous circuit is capable of triggering the processing locally when all of the information is available to distinguish a real event from a false event.

According to the invention, the asynchronous circuit must produce at the output values that make it possible to count or not count events.

Figure 10:
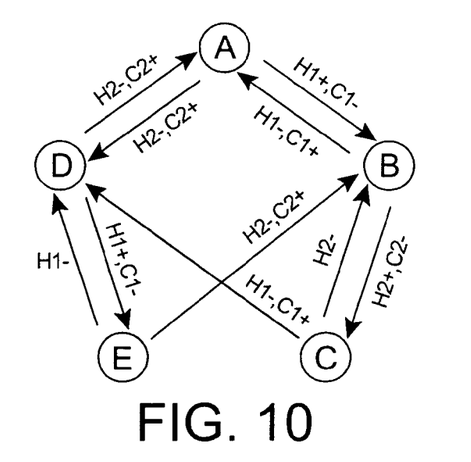

FIG. 10 represents a state diagram of an asynchronous state logic system that makes it possible to realize the above mentioned functions of the correlator.

Figure 8:
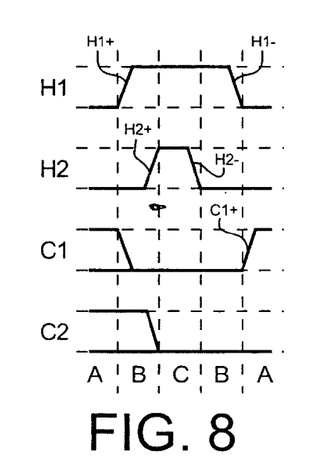
FIG. 8 represents chronograms of pulse detection signals and count signals obtained in a device according to the invention during an interaction at the boundary between two pixels.
Figure 9:
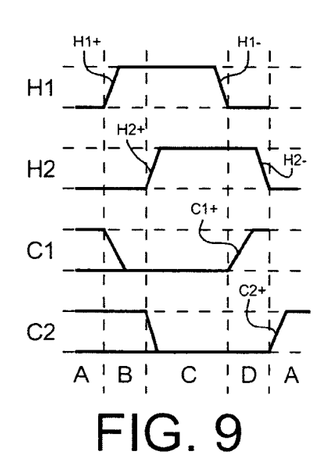
FIG. 9 represents chronograms of pulse detection signals and count signals during two close interactions in two pixels of a device according to the invention; and, FIG. 10 represents an operating state diagram of an events correlator according to one embodiment of the invention.

FIGS. 8 and 9 give examples of chronograms of detection pulse signals H1, H2 and counting pulse signals C1, C2 obtained with the asynchronous system, according to the embodiment of FIG. 10.

FIG. 8 illustrates a case of correlation corresponding to the appearance of two converging (concordant) pulses H1 and H2, the pulse H1 totally overlapping H2 in this case.

FIG. 9, for its part, illustrates a case of absence of correlation in which two divergent pulses H1 and H2 appear, the time bases of which partially but not totally overlap.

In order to distinguish a false event from real events and to trigger a single counting or a double counting of events, the correlation system identifies the two sequences of pulse level transitions indicated in the following table.

Table showing the correlation as a function of sequences of pulse level transitions

| Situation | 2$^{nd}$ situation - FIGS. 5 and 9 Non-Correlation 2 divergent pulses do not totally overlap | 3$^{rd}$ situation - FIGS. 6 and 8 Correlation 2 concordant pulses, one totally overlapping the other |
|---|---|---|
| Interaction phenomenon | 2 real independent events | 1 single event (1 false event) |
| Sequence of pulse transitions | initial front 1$^{st}$ pulse initial front 2$^{nd}$ pulse final front 1$^{st}$ pulse final front 2$^{nd}$ pulse | initial front 1$^{st}$ pulse initial front 2$^{nd}$ pulse final front 2$^{nd}$ pulse final front 1$^{st}$ pulse |
| Counting order | 2 counts of events increment counter n°1 increment counter n°2 | 1 single event count counter n°1 incremented corresponding to the first pulse. other counter not incremented pas |

It appears on examining the previous table that it is at the third transition, in other words at the first final front of the first pulse H1 or the second pulse H2, following the initial fronts of pulses H1 and H2, that the state logic system can determine and discriminate if it is faced with a case of correlation or non-correlation.

Thus, as shown in FIGS. 8 and 9, the state logic system can increment the first counter C1 corresponding to the pixel where the first pulse appeared from initial front B of said first pulse.

However, the logic system can only decide to increment or not the second counter C2 after the third transition C/D or C/B of pulse signals present in the input.

It is uniquely in the case where the final front D of the first pulse H1 appears 8 first (before the final front of the second pulse) that the state logic system "decides" to increment the second counter C2.

The state, diagrams of the asynchronous logic system, illustrated in FIG. 10 and corresponding to the sequences of input conditions and output instructions of FIGS. 8 and 9, comprising five states A,B,C,D,E that are symmetrical from the point of view of signals H1/H2 and C1/C2.

In this embodiment and in the following description of the operation of the correlation system, the event counting is active on the low to high transitions. Alternatively, in other embodiments, an inverse logic may be used.

The initial state A corresponds to an idle state in which the system emits two count signals C1 and C2 at an idle level, here the logic level 1. This idle state is maintained while the pulse signals H1 and H2 remain at an idle level, here the low logic level 0.

When the first input signal H1 receives the initial low to high transition H1+ of a pulse from the detector DET1, the logic system enters a cycle of states B and C. In the first state B of this cycle, the first count signal C1 leaves the idle level, here 1, and takes an active level, here the level 0, the second count signal C2 remaining at the idle level 1. The idle level is, in principle, immaterial, it may be 0 or 1.

If a final front H1− appears in the state B, for example if the H1 immediately returns to the idle level 0 (case of an isolated pulse H1), the logic system returns to the initial idle state A and the first count signal C1 returns to idle level 1. During this transition cycle A/B/A, the counter CNT1 is therefore incremented by one unit corresponding to the isolated event H1 for example.

On the other hand, as shown in FIGS. 8 and 9, if the low to high transition H2+ of a second pulse appears on the other input H2 while the logic system is in the state B, in other words while the first pulse H1 is still active at the level 1 (low to high transition H2+ before the high to low transition H1−) the logic system enters a third state C and activates the second count signal C2 to the level 0.

From this third state C, the logic system can either make a return to the second state B of the cycle A/B/C, or a transition to a fourth state D belonging to another cycle of states A/D/E, depending on whether one is in the case of FIG. 8 or in the case of FIG. 9, in other words in a case of correlation or an absence of correlation.

In the case of correlation, shown in FIG. 8, in other words if the second pulse of signal H2 ends before the end of the first pulse H1, thus if the final front of the second pulse H2− appears first, the system returns from the third state C to the second state B, the count signals remaining at the same levels. Then, when the final front of the first pulse H1− appears next, as in the schematic diagram of FIG. 8, the logic system leaves this second state B to return to the initial idle state A while activating a transition of the first count signal C1+, which goes to the level 1 here. During this cycle of state transitions A/B/C/B/A, the first counter CNT1 is therefore incremented by one unit by the low to high transition of the signal C1, here, whereas the second counter CNT2 is not incremented, in accordance with the provisions in the 3$^{rd}$ situation (cf. counting command of the previous table).

Thus, in the case of correlation, as shown in FIG. 8, in other words if the time base of the pulse H1 totally overlaps the pulse H2 and that the transition fronts H1+ and H1− cover the transition fronts H2+ and H2−, the logic system carries out the state cycle A/B/C/B/A and only the first counter C1 is incremented.

Now, if, as shown in FIG. 9, the first input signal H1 returns to the idle state 0 before the second input signal H2, in other words in the case of non-correlation where the final front H1− of the first pulse H1 appears first (before any final front H2− of the pulse of the second input signal H2 ), the logic system makes a transition from the third state C to a fourth state D belonging to another cycle A/D/E.

During this state transition C/D, the logic system modifies the output C1, which goes to level 1. The low to high transition C1+ increments the counter CNT1.

In this case of non-correlation, as shown in FIG. 9, the final front H2− of the second input signal H2 causes the return from the fourth state D to the initial idle state A and a transition C2+ of the second count signal C2 to the level C2=1. The low to high transition C2+ causes the incrementing of the second counter CNT2.

Thus, in the case of non-correlation shown in FIG. 9, the logic system follows the succession of states A/B/C/D and each of the two counters CNT1 and CNT2 is incremented by one unit, in accordance with the provisions for the 2$^{nd}$ situation of the previous table.

At the end of the two pulses H1 and H2 of the two input signals, the logic system according to the invention has therefore incremented by one unit each of the two counters CNT1 and CNT2 corresponding to each of the detectors DET1 and DET2, thus counting two events in accordance with the objective of processing two real non-correlated events.

The state diagram of FIG. 10 further shows that the logic system according to the invention shows the transitions between the initial state A and the fourth state D, as well as between said fourth state D and a fifth state E. Indeed, if the system in the idle state A receives a low to high transition of pulse H2+ firstly on the second input H2 (situation not illustrated in the diagrams), it makes a transition to the state D during which the second count signal C2− is placed at the level 0. If a final front H2− appears in the state D, for example if the pulse H2 immediately returns to the idle level 0 (case of an isolated pulse H2 ), the logic system returns to the initial idle state A and the first count signal C2 returns to the level 1 in such a way that the counter CNT1 is incremented by one unit corresponding to this isolated event H1 during the cycle A/D/A.

The transition from the state D to the state E takes place in the case of detection of a low to high transition H1+ of the first input signal H1 while the second input signal H2 is already in the active state D. In this case, during the state transition D/E the logic system generates a high to low transition C1− on the output of the first count signal C1.

When the logic system is in the fifth state E and detects the final front H1− of the pulse of the first input signal H1, in other words if the first pulse of signal H1 ends first (before any high to low transition of the second input signal H2), the logic system returns to the fourth state D, the count signals C1 and C2 remaining at the same levels.

The states cycle A/D/E/D/A corresponds to the incrementing operations INC2 of the second counter C2 and to the processing of another case of correlation in which a pulse of signal H2 has a time base that completely overlaps that of a pulse of signal H1 (example not illustrated) and in which only the counter CNT2 is incremented during the state changes D/A.

On the other hand, when the logic system is in the fifth state E and the final front H2− of the pulse of the second input signal H2 appears first, the logic system makes a transition to the second state B during which the output signal C2 changes level, here taking the level 1. This low to high transition C2+ of the second count signal increments the second counter CNT2.

During the succession of states A/D/E/B/A, the logic system then increments by one unit the second counter CNT2 (transition C2+ between the state E and B) then the first counter CNT1 (transition C1+ between the state B and A). This succession of states A/D/E/B/A corresponds to the processing of another case of non-correlation (not shown) in which the two inputs H1 and H2 receive two pulses H1 and H2 of comparable durations, the pulse H1 this time having a late time shift compared to the pulse H2.

At the end of the two pulses H1 and H2 of two input signals, the logic system according to the invention has therefore incremented by one unit each of the two counters CNT1 and CNT2 corresponding to each of the detectors DET1 and DET2, thus counting two events in accordance with the objective of processing two real non-correlated events.

It may be observed that the conditions of transition H2+, H2− and H1+, H1− as well as the output instructions C2−, C2+ and C1− of the fourth and fifth states D and E are transpositions of the conditions of transition H1+,H1− and H2+,H2− as well as the respective output instructions C1−, C1+ and C2− of the second and third states (by permutation of H1 and H2 as well as C1 and C2), the state diagram of the correlator illustrated in FIG. 7-10 being symmetric from the point of view of the inputs H1 and H2 and the outputs C1 and C2.

Thus, according to the embodiment of FIG. 10, the correlator COR receives at least one first input signal H1 and one second input signal H2 from two detector elements and emitting at the output at least one first and one second count signal (C1,C2), the correlator having an asynchronous logic state A,B,C,D,E such that:

when the input signals are in an initial state A of idleness H1=H2=0, the first and the second count signal remain at any idle level (for example C1=C2=0 or C1=C2=1 or C1 and C2 may be equal to 0 or 1;

when the first input signal H1 goes from the initial idle state A to an active state H1+, the first count signal is placed at a first level C1−;

when the first input signal H1− returns from the active state B to the idle state A while the second input signal H2 is idle, the first count signal goes to a second level C1+;

when the second input signal H2 goes to the active state H2+ while the first input signal H1 is in the active state, the second count signal goes to a first level C2−;

when the first input signal leaves the active state H1− while the second input signal H2 is in the active state, the first count signal goes to a second level C1+;

when the second input signal H2 goes from the initial idle state to an active state H2+, the second count signal is placed at a first level C2−;

when the second input signal H2− returns from the active state D to the idle state A while the first input signal H1 is idle, the second count signal goes to a second level C2+;

when the first input signal H1 goes to the active state H1+ while the second input signal H2 is in the active state, the first count signal goes to a first level C1−;

when the second input signal leaves the active state H2− while the first input signal H1 is in the active state, the second count signal goes to a second level C2+.

Or instead, according to the embodiment of FIG. 10, the correlator COR receives at least one first input signal H1 and one second input signal H2 coming from two detector elements and emitting at the output at least one first and one second count signal (C1,C2 ), the correlator having an asynchronous logic state A,B,C,D,E comprising:

means so that, when the input signals are in an initial state A of idleness H1=H2=0, the first and the second count signal remain at any idle level (for example C1=C2=0 or C1=C2=1 or C1 and C2 can be equal to 0 or 1);

means so that, when the first input signal H1 goes from the initial idle state A to an active state H1+, the first count signal is placed at a first level C1−;

means so that, when the first input signal H1− returns from the active state B to the idle state A while the second input signal H2 is idle, the first count signal goes to a second level C1+;

means so that, when the second input signal H2 goes to the active state H2+ while the first input signal H1 is in the active state, the second count signal goes to a first level C2−;

means so that, when the first input signal leaves the active state H1− while the second input signal H2 is in the active state, the first count signal goes to a second level C1+;

means so that, when the second input signal H2 goes from the initial idle state to an active state H2+, the second count signal is placed at a first level C2−;

means so that, when the second input signal H2− returns from the active state D to the idle state A while the first input signal H1 is idle, the second count signal goes to a second level C2+;

means so that, when the first input signal H1 goes to the active state H1+ while the second input signal H2 is in the active state, the first count signal goes to a first level C1−;

means so that, when the second input signal leaves the active state H2− while the first input signal. H1 is in the active state, the second count signal goes to a second level C2+.

Thus, as shown in FIGS. 8–9, when an initial front H1+ of a first pulse signal H1 appears from a detector element DET1 followed by an initial front H2+ of a second pulse signal H2 from a another detector element DET2, the correlation system or the correlator is capable of:

generating a first count signal C1+ after the appearance of the initial front H1+ of the first pulse signal, in such a way as to increment one of the counters CNT1, and then, either generating a second count signal C2+ when the final front H1− of the first pulse signal H1 appears before any final front of the second pulse signal H2 (case of FIG. 9), in such a way as to increment the other counter CNT2, or not generating another count signal C2=0 if the final front H2− of the second pulse signal H2 appears before the final front H1− of the first pulse signal H1.

In this embodiment of the asynchronous logic states correlation system, it appears that the system has five states and, consecutively, five state memories.

The above description of embodiments of the invention deals with the case of the correlation of the pulse signals H1 and H2 of two acquisition chains AMP1/CMP1 and AMP2/CMP2 coming from two neighboring detector elements DET1 and DET2 (two adjoining pixels).

Other embodiments of state diagrams and variations of input and output state transitions may be envisaged from the example of this embodiment without going beyond the scope of the present invention.

In order to conceive a device according to the invention, or a state machine according to the invention, or a state device or machine using a method according to the invention, several solutions may be envisaged: one may either use synthesis tools specific to the synthesis of asynchronous state machines, or use an appropriate description language (such as CHP or CSP) and then synthesize this circuit with asynchronous circuit synthesis tools. One may refer to the document of M. Renaudin et al. "A design framework for asynchronous/synchronous circuits based on CHP to HDL translation", IEEE, 1999, p. 135–144.

In a more general manner, the correlator provided according to the invention may be used not just for rejecting concordances of events between two adjoining pixels but also for accepting concordances of events between any pixels, whether adjoining or not.

EXAMPLES OF APPLICATION OF THE INVENTION

The invention advantageously applies to radiation detection devices arranged in a matrix architecture, in which the detection layer(s) constitute a network of closely related elementary detectors combined with an acquisition chain matrix, particularly those used in imaging.

Within the scope of such an application, each acquisition chain can be linked to several adjoining acquisition chains, each link comprising a correlation system capable of comparing the temporal overlap of the electric signals emitted by the chain with the signals concerned by the link.

Thus, it is provided that the correlators of-the acquisition and event counting circuits are laid out in a matrix arrangement, each correlator being connected to a respective detector element and to at least one adjoining detector element, the correlator being capable of comparing the temporal overlap of linked pulse signals.

In an advantageous manner, the invention improves the quality of images obtained with matrix sensors by avoiding losses of statistical information represented by the counting of false events and improves the performance and thee quality of the imager, such as the contrast and the sharpness of the image.

The invention applies particularly advantageously to the field of medical imaging, especially X-ray imaging, a field in which any loss of information or deterioration in the performance would be prejudicial to the quality of the diagnosis.

As another specific application example, the invention is suitable for digital tomography devices, known as scanners, and in which it is advantageous to be able to reject the correlations or coincidences between adjoining pixels.

The invention further applies to the case of electron-positron pair emission tomography (PET). In this case, each recombination of an electron with a positron leads to the simultaneous emission of two γ radiations in opposite directions at an angle of 180°.

In said tomography, in order to recognize that a γ radiation captured by a first detector and another γ radiation captured by a second detector, situated in the opposite zone to the first, originate S from a true recombination and not non-correlated false events (disintegrations, emissions of any γ radiation, etc.) and to localize the place and more precisely the point of origin of the emission of the two γ radiations, one detects the capture coincidences of two photons γ by two detectors situated in opposite zones. Advantageously, according to the invention, the correlators are used to detect such coincidences, with the exception that this time one accepts the coincidences, in other words that in the case of correlation of detection of events by two detectors situated in opposite zones, one accepts the correlation instead of rejecting this case, and one increments a corresponding counter. Then, in the case of non correlation, in other words in the case of detection of detection events with a time gap that do not correspond therefore to a real recombination, one considers that it involves false events and the counter associated with the two detectors is not incremented.

The invention may be further realized with a radiation detection device comprising a plurality of detector elements, each detector element being associated with a circuit for acquiring pulse signals and counting detection events, the device comprising correlators of detection events corresponding to two detector elements and receiving the pulse signals coming from the respective detector elements, particularly situated in opposite zones, each correlator controlling the means of counting corresponding to the two paired detector elements and being used in such a way as to count a detection event when two pulse signals are correlated (or concordant) and not to count an event when two pulse signals diverge or are not correlated.

Apart from the fields of radiology and X-ray radiography, the invention also applies to the fields of measuring the exposure to other types of radiation, such as imaging based on the emission of electron-positron pairs (positron camera), the remote detection of α,β,γ, radiation, visible light or beyond visible light imaging (photons of ultraviolet radiation and wavelengths on this side, photons of infrared radiation and wavelengths on the other side).

Other applications, variations and embodiments could be implemented by those skilled in the art, without going beyond the scope of the present invention.

The realization of a device operating according to the invention may be achieved in accordance with the indications contained in the thesis of Pascal VIVET, 21 Jun. 2001, entitled "*Méthodologie de conception de circuits intégrés quasi-insensibles aux délais: application à l'étude et la réalisation d'un processeur RISC 16 bit asynchrone*" Methodology for designing integrated circuits that are virtually insensitive to time lags: application to the study and realization of an asynchronous RISC 16 bit processor), Institut National Polytechnique de Grenoble.

The invention claimed is:

1. Radiation detection device comprising:
   a plurality of detector elements, each detector element being associated with a circuit configured to acquire pulse signals and counting detection events; and,
   at least one correlator of detection events corresponding to at least two detector elements, said at least one events correlator configured to compare a temporal overlap of a pulse signal from one detector element with another pulse signal from another detector element.

2. The radiation detection device according to claim 1, said at least one correlator receiving at least two pulse signals coming from respective detector elements and controlling counters respectively corresponding to each detector element, in such a way as to count a single detection event when two pulse signals concord.

3. The radiation detection device according to claim 1, the at least one correlator configured to distinguish cases of correlation or concordance, in the case of temporal overlap of a pulse signal by another pulse signal, and cases of non-correlation, in the case of a simple time lag of one pulse signal compared to another pulse signal.

4. The radiation detection device according to claim 1, the at least one correlator configured to distinguish cases of correlation or concordance, in which a time base of a pulse completely overlaps a time base of another pulse, compared to cases of non-correlation, in which a time base of a pulse partially overlaps or does not overlap a time base of another pulse.

5. The radiation detection device according to claim 1, the at least one correlator configured to do at least one of the following:
   increment a counter corresponding to each pulse signal from a respective detector element, as long as the pulse signal is produced in isolation,
   increment only one of the corresponding counters when two pulse signals are correlated, the duration of a first pulse overlapping in time the duration of a second pulse; and
   increment two of the corresponding counters when two pulse signals are decorrelated, the duration of the first pulse partially overlapping or not overlapping in time the duration of the second pulse.

6. Radiation detection device comprising:
   a plurality of detector elements, each detector element being associated with a circuit configured to acquire pulse signals and counting detection; and
   at least one correlator of detection events corresponding to at least two detector elements, said at least one events correlator configured to compare a temporal overlap of a pulse signal from one detector element with another pulse signal from another detector element, and having an asynchronous logic capable of comparing the configured to compare occurrence chronologies of transitions fronts of at least two pulse signals from respective detector elements.

7. The radiation detection device according to claim 1 or the at least one correlator detecting a case of correlation or concordance when an initial front of a first pulse signal is followed by an initial front of a second pulse signal which is itself followed by a final front of the second pulse signal.

8. The radiation detection device according to claim 1 or 6, the at least one correlator detecting a case of non-correlation when an initial front of a first pulse signal is followed by an initial front of a second pulse signal which is itself followed by a final front of the first pulse signal.

9. Radiation detection device comprising:
a plurality of detector elements, each detector element being associated with a circuit configured to acquire pulse signals and counting detection events,
at least one correlator of detection events corresponding to at least two detector elements, configured, when an initial front of a first pulse signal from a detector element appears followed by an initial front of a second pulse signal from another detector element, to:
generate a first count signal and,
either generate a second count signal when the final front of the first pulse signal appears before the final front of the second pulse signal, or
not generate another count signal when the final front of the second pulse signal appears before the final front of the first pulse signal.

10. The radiation detection device according to claim 1, or 6 or 9, said at least one correlator receiving at least one first input signal and a second input signal from two detector elements and emitting at the output at least one first and one second count signal, said at least one correlator having an asynchronous logic state such that:
when the input signals are in an initial idle state, the first and the second count signals remain at an idle level;
when the first input signal goes from the initial idle state to an active state, the first count signal makes a state transition to a first level;
when the second input signal goes to the active state while the first input signal is in the active state, the second count signal makes a state transition to a first level;
when the first input signal leaves the active state while the second input signal is in the active state, the first count signal makes a state transition to a second level;
when the second input signal goes from the initial idle state to an active state, the second count signal makes a state transition to a first level;
when the first input signal goes to the active state while the second input signal is in the active state, the first count signal makes a state transition to a first level;
when the second input signal leaves the active state while the first input signal is in the active state, the second count signal makes a state transition to a second level.

11. The radiation detection device according to claim 1, or 6 or 9, in which the at least one correlator has an asynchronous logic state comprising at least five state memories.

12. The radiation detection device according to claim 1, or 6 or 9, comprising several correlators and in which the correlators of the acquisition and event counting circuits are laid out in a matrix arrangement, each correlator being connected to a respective detector element and to at least one adjoining detector element, the correlators configured to compare the temporal overlap of the corresponding pulse signals.

\* \* \* \* \*